Patented May 30, 1933

1,912,189

UNITED STATES PATENT OFFICE

HENRY GAULT AND BERNARD MARIUS ROBERT ANGLA, OF LYON, FRANCE, ASSIGNORS TO SOCIETE DES USINES CHIMIQUES RHONE-POULENC, OF PARIS, FRANCE

MANUFACTURE OF CELLULOSE BUTYRIC ESTERS

No Drawing. Application filed January 3, 1930, Serial No. 418,431, and in Great Britain January 22, 1929.

This invention relates to the manufacture of cellulose butyrates and it has for its object a process of manufacture of new such butyrates. The new products so obtained are characterized by the fact that they are soluble in methyl alcohol. Some of them are only soluble in hot methyl alcohol, and are simultaneously soluble in benzene at ordinary temperature; others are soluble both in methyl alcohol and in benzene at ordinary temperature, finally, others are soluble in methyl alcohol at ordinary temperature, and either insoluble in benzene or only soluble in hot benzene.

According to invention, the process of manufacture of these new cellulose butyrates consists in subjecting a cellulose tributyrate, dissolved into a solvent containing water, to the saponification action of this water, preferably in presence of a saponification catalyst, until the required degree of solubility in methyl alcohol is obtained.

In carrying out the process according to this invention, any solvent of cellulose tributyrate may be used for the solution, the required quantity of water being added, with, if desired, the catalyst; but it is, of course, necessary that the whole constitutes a homogeneous mixture. As an example of a solvent, butyric acid, or its homologues or their mixtures, may be mentioned. In certain cases it is advantageous to add compounds enhancing the formation of the desired homogeneous medium, such as, for example, methyl or ethyl alcohol. As catalysts, the agents employed in the saponification of cellulose acetate may be used, for instance: mineral acids, aromatic or aliphatic sulphonic acids: salts with acid reaction, such as bisulphates and zinc chloride, give also good results. The working temperature may vary between relatively wide limits according to the catalyst used, the operation being completed more rapidly when it is carried out at a higher temperature.

In carrying out the invention, the initial cellulose butyrate solution may be prepared with a cellulose tributyrate by itself or the saponification may be carried out directly on the solution of cellulose tributyrate resulting from the butyration of cellulose by means of butyration agents. In the latter case, the catalyst used for performing the butyration can also be used as saponification catalyst, but a fresh quantity of this catalyst may also be added, for the purpose of performing the saponification, or this catalyst may be partially or entirely neutralized, and another catalyst may be added.

The new cellulose butyrates prepared according to this invention may be applied to all the uses to which cellulose acetate can be put; particularly, it is applicable to the manufacture of celluloid-like masses, films, artificial silk or varnishes. Their employment leads to important developments, because the objects which can be obtained by using them have excellent mechanical properties; the films, for example, are strong and more flexible than those obtained with tributyrates. The best products, from this point of view, seem to be butyrates which are simultaneously soluble at ordinary temperature in methyl alcohol and benzene.

The following examples, given merely as illustrations, will make clear how the invention may be carried out. The parts are by weight.

*Example 1.*—150 parts of cellulose tributyrate are dissolved at ordinary temperature in 800 parts of diluted butyric acid (of 87% butyric acid by weight). When the solution is thoroughly homogeneous, a mixture of 600 parts of acetic acid and 15 parts of sulphuric acid 66° Bé. is added with stirring. The mixture is stirred for 18 hours at 45° C. The new butyric ester is precipitated by addition of water, and, after being washed and dried, it is obtained in the form of white flakes soluble at ordinary temperature in methyl alcohol and benzene. The product is also soluble in acetone and chloroform. Its collodions give, by evaporation, transparent and clear films, the flexibility of which is good.

*Example 2.*—Cellulose tributyrate is first prepared, according to the process described in our U. S. A. application Serial No. 406,716, in the following manner:

A mixture of 120 parts of cellulose and 50 parts of butyric acid is stirred for two hours, and then is heated to 90° C. for 16 hours. After cooling at the ordinary temperature, 550 parts of butyric acid are added and the mass is stirred for two hours. A mixture of 690 parts of butyric anhydride and 144 parts of methane sulphonic acid are then added and the whole is stirred for 5 hours, the temperature being maintained between 25° and 38° C. A viscous and homogeneous cellulose tributyrate solution, which is free from fibres, is obtained in this manner in the midst of the butyration mixture.

The saponification is then carried out by running into the solution 900 parts of dilute butyric acid (of 76% butyric acid by weight) and the mixture is stirred for 16 to 17 hours at 48 to 50° C. The butyric ester is then precipitated with water or any other suitable agent and it is washed and dried. The cellulose butyrate so obtained is soluble at ordinary temperature in benzene and methyl alcohol; it is also soluble in acetone and chloroform, but it is insoluble in ether and ligroin. Its collodions are viscous and give, by evaporation of the solvent, flexible and strong films of excellent quality.

*Example 3.*—200 parts of cellulose tributyrate are dissolved in 800 parts of acetic acid. A viscous and homogeneous collodion is obtained in this manner, to which a mixture is added of 1100 parts of diluted butyric acid (of 87% butyric acid by weight) and 70 parts of concentrated hydrochloric acid (35%). When the mixture is thoroughly homogeneous, it is stirred for 16 hours at 50° C. After cooling, the butyric ester is precipitated with dilute alcohol. It is soluble in methyl alcohol at ordinary temperature and insoluble in benzene, whether at ordinary temperature or not. It is, besides, soluble in acetone, and in benzene containing alcohol, but it is insoluble in water, ether and ligroin.

What we claim and desire to secure by Letters Patent is:—

1. A process of manufacture of new cellulose butyrates soluble in methyl alcohol, consisting in dissolving cellulose tributyrate at ordinary temperature in diluted butyric acid, adding to the homogeneous solution, with stirring a mixture of acetic acid and sulphuric acid, stirring the mixture, precipitating the new butyric ester with water, washing and drying.

2. Cellulose butyric esters, soluble in methyl alcohol, and which give collodions producing by evaporation transparent, clear and flexible films.

3. Cellulose butyric esters soluble in hot methyl alcohol and in benzene at ordinary temperature.

4. Cellulose butyric esters soluble in methyl alcohol at ordinary temperature and in benzene at ordinary temperature.

5. Cellulose butyric esters soluble in methyl alcohol at ordinary temperature and insoluble in benzene either hot or at ordinary temperature.

In testimony whereof we have signed our names to this specification.

HENRY GAULT.
BERNARD MARIUS ROBERT ANGLA.